(12) United States Patent
Kocberber et al.

(10) Patent No.: US 11,379,456 B2
(45) Date of Patent: Jul. 5, 2022

(54) EFFICIENT ADJUSTMENT OF SPIN-LOCKING PARAMETER VALUES

(71) Applicant: Oracle International Corporation, Redwood Shores, CA (US)

(72) Inventors: Onur Kocberber, Zurich (CH); Mayur Bency, Redwood City, CA (US); Marc Jolles, Zurich (CH); Seema Sundara, Nashua, NH (US); Nipun Agarwal, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 17/060,999

(22) Filed: Oct. 1, 2020

(65) Prior Publication Data
US 2022/0107933 A1 Apr. 7, 2022

(51) Int. Cl.
*G06F 16/23* (2019.01)
*G06F 16/245* (2019.01)

(52) U.S. Cl.
CPC ........ *G06F 16/2343* (2019.01); *G06F 16/245* (2019.01)

(58) Field of Classification Search
CPC .......................... G06F 16/2343; G06F 16/245
See application file for complete search history.

(56) References Cited

U.S. PATENT DOCUMENTS 7,594,234 B1 * 9/2009 Dice ...................... G06F 9/461
718/100

9,262,233 B1 * 2/2016 Reed ........................ G06F 9/52
(Continued)

FOREIGN PATENT DOCUMENTS

CN 103729242 A * 4/2014
CN 104932933 B * 11/2018
(Continued)

OTHER PUBLICATIONS

P. H. Ha, M. Papatriantafilou and P. Tsigas, "Reactive spin-locks: a self-tuning approach," 2005, 8th International Symposium on Parallel Architectures, Algorithms and Networks (ISPAN'05), doi: 10.1109/ISPAN.2005.73 (Year: 2005).*

(Continued)

*Primary Examiner* — James E Richardson
(74) *Attorney, Agent, or Firm* — Hickman Becker Bingham Ledesma LLP (57) ABSTRACT

Systems and methods for adjusting parameters for a spinlock implementation of concurrency control are described herein. In an embodiment, a system continuously retrieves, from a resource management system, one or more state values defining a state of the resource management system. Based on the one or more state values, the system determines that the resource management system has reached a steady state and, in response adjusts a plurality of parameters for spin-locking performed by said resource management system to identify optimal values for the plurality of parameters. After adjusting the plurality of parameters, the system detects, based on one or more current state values, a workload change in the resource management system and, in response, readjusts the plurality of parameters for spin-locking performed by said resource management system to identify new optimal values for the parameters.

21 Claims, 3 Drawing Sheets

(56) References Cited

U.S. PATENT DOCUMENTS

| | | | |
|---|---|---|---|
| 10,691,658 B2 | 6/2020 | Kameswaran | |
| 2009/0144746 A1* | 6/2009 | Song | G06F 9/505 718/105 |
| 2010/0005468 A1* | 1/2010 | Chang | G06F 11/3409 718/102 |
| 2021/0132998 A1* | 5/2021 | Uchida | G06F 11/3476 |

FOREIGN PATENT DOCUMENTS

| | | | | |
|---|---|---|---|---|
| CN | 109086124 A | * | 12/2018 | |
| KR | 20180066387 | | 6/2018 | |
| KR | 20180066387 A | * | 6/2018 | G06F 9/5077 |

OTHER PUBLICATIONS

Anderson, Thomas E., "The Performance of Spin Lock Alternatives for Shared-Money Multiprocessors", IEEE Transactions on Parallel and Distributed Systems, vol. 1, No. 1, Jan. 1990, pp. 6-16.

Djellel, Eddine Difallah et al., "OLTP-Bench: An Extensible Testbed For Benchmarking Relational Databases", Proceedings of the VLDB Endowment 7.4, 2013, pp. 277-288.

Kraus, Alois, "Why Skylake CPUs Are Sometimes 50% Slower—How Intel Has Broken Existing Code", available: https://aloiskraus.wordpress.com/2018/06/16/why-skylakex-cpus-are-sometimes-50-slower-how-intel-has- broken-existing-code/, 2018.

"Sysbench," [Online]. Available: https://github.com/akopytov/sysbench, [Accessed Dec. 31, 2020], 9pgs.

Aminikhanghahi, Samaneh et. al, "A survey of methods for time series change point detection. Knowledge and Information Systems", 2016, pp. 1-29.

Zhang, Ji et al. "An End-to-End Automatic Cloud Database Tuning System Using Deep Reinforcement Learning", Proceedings of the 2019 International Conference on Management of Data, 2019.

Oracle, "15.5.1 Buffer Pool," MySQL 8.0 Ref Manual, https://dev.mysql.com/doc/refman/8.0/en/innodb-buffer-pool.html, 2021, 7pgs.

Oracle, "The Information_Schemainnodb_Buffer_Poolstats Table," https://dev.mysql.com/doc/refman/8.0/en/information-schema-innodb-buffer-pool-stats-table.html, first accessed May 5, 2021, 5pgs.

S. Gharghabi et al., "Matrix Profile VIII: Domain Agnostic Online Semantic Segmentation at Superhuman Performance Levels", 2017 IEEE International Conference on Data Mining (ICDM), New Orleans, LA, 2017, pp. 117-126.

Tan, Jian, et al., "IBTune: Individualized Buffer Tuning for Large-scale Cloud Databases", in Proceedings of the VLDB Endowment, vol. 12, No. 10, DOI: https://doi.org/10.14778/3339490.3339503, 2019, 14pgs.

Van Aken, Dana et al., "Automatic Database Management System Tuning Through Large-scale Machine Learning", SIGMOD Conference, 2017, pp. 1009-1024.

Difallah, D., et al., "OLTP-Bench: An extensible testbed for benchmarking relational," in Proceedings of the VLDB Endowment, vol. 7, No. 4, 2013, 12pgs.

X86 Instruction Set Reference, "Pause, Spin Loop Hint", https://c9x.me/x86/html/file_module_x86_id_232.html, Nov. 2016, 1 page.

MySQL on ARM, "Understanding InnoDB rw-lock stats", https://mysqlonarm.github.io/Understanding-InnoDB-rwlock-stats/, Apr. 14, 2020, 10 pgs.

MySQL 8.0 Reference Manual, "15.8.12 Enabling Automatic Configuration for a Dedicated MySQL Server", https://dev.mysql.com/doc/refman/8.0/en/innodb-dedicated-server.html, May 2015, 4 pgs.

Harizopoulos, Stavros, et al., "OLTP Through the Looking Glass, and What We Found There", SIGMOD 2008, Jun. 9, 2008, https://doi.org/10.1145/1376616.1376713, pp. 981-992, 12 pages.

Falsafi, Babak, et al., "Unlocking Energy", 2016 USENIX Annual Technical Conference, https://www.usenix.org/conference/atc16/technical-sessions/presentation/falsafi, pp. 393-406, Jun. 22, 2016, 15 pages.

MySQL 8.0 Reference Manual, "15.8.8 Configuring Spin Lock Polling", https://dev.mysql.com/doc/refman/8.0/en/innodb-performance-spin_lock_polling.html, dated Oct. 2020, 2 pages.

The International Searching Authority, "Search Report" in Application No. PCT/US2021/047971, dated Dec. 8, 2021, 12 pages.

Current Claims in Application No. PCT/US2021/047971, dated Dec. 2021, 8 pages.

* cited by examiner

EFFICIENT ADJUSTMENT OF SPIN-LOCKING PARAMETER VALUES

FIELD OF THE DISCLOSURE

The present disclosure relates to lock-based concurrency control for resource management systems and database management systems. More specifically, the present disclosure relates to improvements in spin-locking as a means for responding to a query when a resource is being accessed.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Concurrency control in resource management systems ensures that requests for access to resources are provided with a correct version of the resources. In lock-based concurrency control, a process or operation requests access to one or more resources and, if the one or more resources are available, the process or operation is given a lock on the one or more resources. While the process or operation maintains the lock on the one or more resources, other processes or operations cannot access the one or more resources.

When a process or operation requests access to a resource that is locked by another process or operation, there are a few possible responses that can be given. As an example, the resource management system may reject the request for access, requiring a new request to be made in the future. This can be ineffective for systems which receive a large number of queries or have relatively short transaction times. Thus, many systems use a spin-lock implementation whereby a thread is made to wait by executing PAUSE instructions prior to re-requesting access to the resource. This cycle may be repeated a number of times until either the resource becomes available or a certain number of cycles pass and the system performs a context switch.

While spin-locks tend to be very efficient for implementing concurrency control, different configurations of the spin-locks can be less effective and lead to a waste of CPU cycles or longer query times. Spin-locks can be configured by changing values for one or more spin-lock parameters, including parameters relating to how long the thread waits before retrying to access the resource, often expressed in a number of PAUSE instructions, and how many times the thread attempts to access the resource before the system performs a context switch. Optimal values for these parameters can ensure a thread is not wasting CPU cycles by spinning for too long on a resource that is unlikely to come available soon or ensure a thread can quickly access a resource when it becomes available.

Property tuning of the aforementioned parameters can be difficult for a multitude of reasons. One issue is that the most optimal values for spin-locking parameters tend to be workload specific. Additionally, optimal values may change as new software is released or old software is updated. Thus, pre-tuning the parameters to find optimal default parameters is impossible when the spin-lock is to be applied to different servers or different types of workloads.

A second issue is that workloads rarely remain static. When a workload changes, the optimal parameter values for spin-locking will also change. While the values can be retuned, the time it takes for an operator to identify the decrease in efficiency and retune the values is all time when the system is running less efficiently. Alternatively, the parameters may be tuned continuously or periodically, but this increases the inefficiency as the act of tuning the parameters can cause the system to perform less efficiently, such as when values are selected that cause the system to run less efficiently than when default parameters are set.

A third issue is that the length of a single PAUSE instruction can be hardware dependent. For each system architecture, the delay values which are expressed in terms of a number of PAUSE instruction would have to be modified. Additionally, if code is transferred from one system architecture to another, new parameter values would need to be determined for the new system architecture.

Thus, there is a need for a system that can dynamically tune parameter values for spin-locking to ensure efficient use of resources.

SUMMARY

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Systems and methods for dynamically tuning spin-locking parameters are described herein. According to an embodiment, a client initiates a tuning mechanism by spawning three threads which operate in parallel. A first thread monitors a state of the resource management system through a collection of workload statistics while a second thread determines, based on the monitored state of the resource management system, when a steady state has been achieved. When the second thread detects the steady state, the information is passed to the third thread which tunes values for a plurality of spin-locking parameters. When the parameters have been tuned, the third thread spawns a fourth thread to detect a workload change based on the monitored state of the resource management system. When a workload change is detected by the fourth thread, the information is passed to the third thread which tunes values for the plurality of spin-locking parameters again. In an embodiment, instead of passing the information back to the third thread, the fourth thread reinitializes the second thread, thus causing the system to wait for a steady state before performing the tuning again.

The tuning may be performed by sweeping through a set of values for each parameter and keeping the value that optimizes performance. The range of values for each parameter and/or direction of the sweep may be determined, at least in part, based on the monitored state of the database, thus reducing any inefficiencies caused by the tuning process.

Detecting the steady state and the workload change may be performed by comparing current performance values, such as a throughput value, to previous performance values in a sliding window. The steady state may be detected when the difference between the current performance values and the previous performance values are less a first threshold value while the workload change may be detected when the difference between the current performance values and the previous performance values are greater than a second threshold value.

Structural Overview

Figure 1:
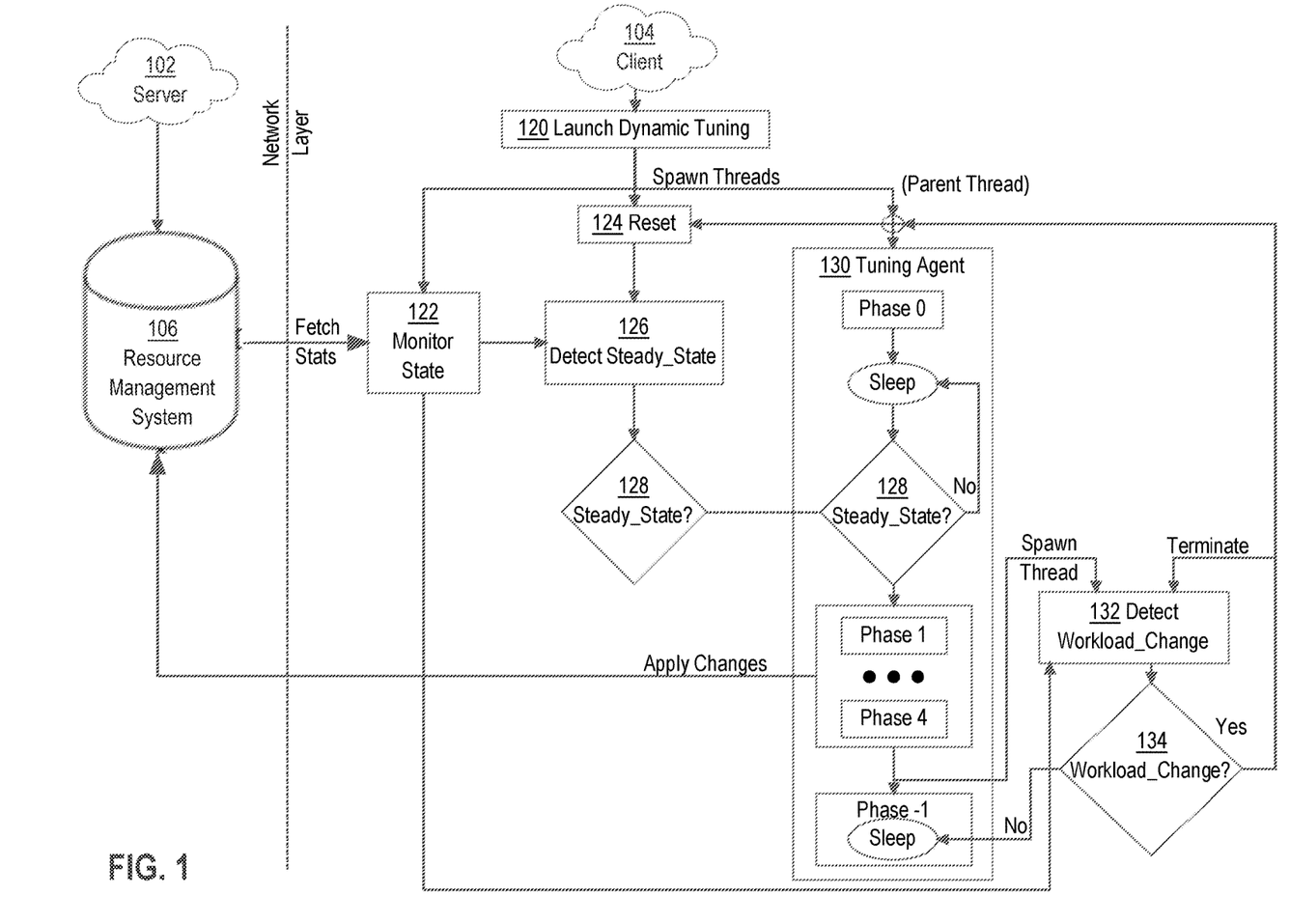
FIG. 1 depicts an example system and process for adjusting spin-locking parameters.

FIG. 1 depicts an example system and process for adjusting spin-locking parameters. Server 102, client 104, and resource management system 106 communicate over a network. Resource management system 106 may be any system configured to manage access to resources, such as a database management system or file server management system. Server 102 may store the resources managed by the resource management system 106 in persistent storage. Client 104 may comprise an application and/or client device that interacts with the server 102 and/or resource management system 106. As used herein, "the system" refers to one or more of the devices of FIG. 1 implementing the methods described herein.

The resource management system 106 manages access to resources through spin-locking. When a resource is being accessed by a thread, the resource management system locks the resource, denying access to the resource to future threads until the lock is removed. With a spin-lock, when a thread attempts to access a locked resource, the resource management system causes the thread to wait and periodically check to see if the resource is available. The resource management system may implement the spin-lock according to a plurality of parameters. The plurality of parameters may specify how long the resource is to spin before checking to see if the resource is available and/or a sync-loop parameter that defines how many cycles of spinning and checking to perform prior to blocking the thread and performing a context switch.

In an embodiment, the spin-lock utilizes PAUSE instructions to cause the system to wait before checking to see if the lock on the resource has been released. Each additional PAUSE instruction causes the system to wait a particular period of time before performing a next action. The number of PAUSE instructions used by system in the spin-lock may depend on one or more of the aforementioned parameters. For instance, two configurable parameters may include a spin wait delay parameter and a spin wait PAUSE multiplier parameter. The system may determine a number of PAUSE instructions by randomly or pseudo-randomly selecting a value between 0 and the spin wait delay parameter value and multiply the selected value by the spin wait PAUSE multiplier parameter value. As a practical example, if the spin wait delay parameter value is 6 and the spin wait PAUSE multiplier value is 50, the system may select a value between 0 and 6, such as 3, and multiply it by the spin wait PAUSE multiplier value of 50 to produce 150. Thus, the system may execute 150 PAUSE instructions before checking to see if the resource is available.

Steps 120-134 define a method for optimizing adjustments of one or more of the aforementioned parameter values. At step 120, the system launches the dynamic tuning process. The dynamic tuning process may be launched in response to an initiation of access to the resource management system 106, such as a spin-up of server 102 or a beginning of operations through resource management system 106. In response to launching the dynamic tuning, the system spawns a plurality of threads. For example, the system may spawn three threads that operate in parallel.

A monitor state thread 124 monitors a state of the resource management system 106. For example, the monitor state thread 124 may continuously and/or periodically fetch statistics from the resource management system. The statistics may comprise performance metrics for the resource management system that are obtained and stored by the monitor state thread, thereby allowing the monitor state thread to analyze behavior of a workload over a period of time through differences between historical metrics and current metrics. Example performance metrics may include a throughput value, defined as a number of queries or transactions per second, an average buffer pool hit rate value, defined as a fraction of requests that are satisfied through data stored in the buffer pool, metrics relating to spin-locking, such as total spin events, total rounds of spinning, number of rounds per spin, total operating system waits, or current spin-locking parameter values, or other values relating to performance of the resource management system.

At step 124, the detect steady state thread 126 initializes or reinitializes. In response to initializing or reinitializing, at step 128, the detect steady state thread 126 detects when the system reaches a steady state. The detect steady state thread 126 may determine whether the system has reached a steady state based on statistics received from the monitor state thread 122. Methods for detecting whether the system has reached a steady state are described further herein. At step 128, the system determines whether the steady state has been reached. Results of the determination of step 128 are provided to the third thread 130 comprising the tuning agent 130.

The tuning agent thread 130 begins at phase 0 where the tuning agent thread 130 waits until a steady state has been reached. The tuning agent 130 may periodically request from the detect steady state thread, an indication as to whether the system has reached a steady state. If the system has not reached a steady state, the tuning agent thread 130 may return to the sleep state. Additionally or alternatively, the tuning agent thread 130 may remain in a sleep state until the detect steady state thread detects the steady state and updates the tuning agent thread 130. In response to determining that a steady state has been reached, the tuning agent thread 130 begins adjusting the one or more parameters for spin-locking at the resource management system. Methods for adjusting the one or more parameters are described further herein.

Changes to the one or more parameters are then applied to the spin-locking process at the resource management system 106. Phases 1-4 of the tuning process may involve a process of making changes to the one or more parameters, waiting a particular period of time, and obtaining additional statistics from the resource management system 106 and/or monitor state thread. The process may be performed multiple times, thus creating multiple instances of changes to the one or more parameters and storage of statistics after each of the changes.

After performing the adjustments to the one or more parameters, the tuning agent thread 130 may enter a sleep state. Additionally or alternatively, the tuning agent may spawn a detect workload change thread 132 prior to entering the sleep state. The detect workload change thread 132 detects a workload change based on the monitored statistics received from the monitor state thread. Methods for detecting a workload change are described further herein. At step 134, the detect workload change thread 132 determines whether a workload change has occurred. If not, the tuning agent thread 130 remains in a sleep state. If a workload change occurs, the system terminates the detect workload change thread 132, resets the detect steady state thread at step 124, and restarts the tuning agent at step 130. Thus, once a steady state is detected again, the system will readjust the one or more parameters and spawn a new thread to detect workload changes.

The method of FIG. 1 provides a specific example for performing an adaptive tuning of parameters for a spin-locking process. Other examples may include more or less threads or devices performing the steps of FIG. 1. For instance, the server computer may execute the tuning agent without the client device. Additionally, multiple client devices, server computers, resource management systems, or other devices may communicate to perform the methods described herein.

Detecting Steady State and Workload Change

In an embodiment, the client determines that the resource management system has reached a steady state based on current and previous performance metrics. For example, the system may monitor a throughput value which identifies a number of queries or transactions per second. The system may determine that the system has reached a steady state if the throughput value over a particular period of time has not changed by more than a threshold value. In an embodiment, the system further determines whether the steady state has been reached based on a buffer pool hit rate value. For example, the system may determine that the system has reached a steady state if both the throughput value and the buffer pool hit rate value have not changed by more than a threshold value over a particular period of time. The threshold values and periods of time for the throughput value may be different threshold values and/or periods of time as for the buffer pool hit rate value.

In an embodiment, a windowing method is used to determine whether the throughput value and/or the buffer pool hit rate value have changed by less than a threshold value over a particular period of time. A first window time window may be used to identifying a rolling median. For example, the system may define a window with a particular size, such as ten previous values. For each point in time, a median may be computed using the previous ten throughput values stored by the monitor state thread. A second rolling window may be used to calculate a percentage difference between its latest data-point and its oldest data point. The second rolling window may comprise a window of a particular number of previous median values from the first window. When a percentage difference calculated using the second rolling window and/or a particular number of percentage differences in a row calculated using the second rolling window are less than a threshold value, the thread may determine that a steady state has been reached.

As a practical example of the windowing method, assume that the first window comprises a previous 5 throughput values and the second window comprises the previous 5 median values. Additionally, assume that a steady state is reached if the last two percentage differences are below 15%. Assume the last ten throughput values received were: 1, 1, 2, 3, 2, 4, 3, 2, 1, 2. The median values calculated using the first rolling window would be 2, 2, 3, 3, 2, 2. The percentage differences computed using the second rolling window would be 0% and 0% as the first and fifth value are both 2 and the second and sixth value are both 2. The system would determine that the steady state has been reached as the last two percentage differences were both below 15%.

The size of the first window, size of the second window, threshold, and/or number of values that are below the threshold may be received through user input or pre-configured as default hyperparameters. The same windowing method may be used for determining whether the buffer pool hit rate has changed with buffer pool hit rate values used instead of throughput values. The windows, percentage thresholds, and/or number of values that are below the threshold may differ for the two value types. Thus, the system may be configured to determine that a steady state has been achieved if the last 4 percentage differences for the throughput value are below a first threshold and the last 3 percentage differences for the buffer pool hit rate values are below a second threshold.

In an embodiment, the client determines that the resource management system has undergone a workload change based on current and previous performance metrics. For example, the system may monitor a throughput value which identifies a number of queries or transactions per second. The system may determine that the system has undergone a workload change if the throughput value over a particular period of time has changed by more than a threshold value.

In an embodiment, a similar windowing method is used to determine if the resource management system has undergone a workload change. For example, the system may determine a workload change has occurred if a particular number of percentage differences between a newest median throughput value and an oldest median throughput value is greater than a threshold value. The number of values in each window, threshold value, and/or number of values that must be above the threshold value may be received through input and/or pre-configured as default values. The window size, threshold values, and/or number of values may additionally differ from the values used to determine if a steady state has been reached. For example, the windows for the steady state determination may be larger or the threshold value for determining a steady state may be lower than the threshold value used for determining a workload change.

The windowing examples described above comprise one example for algorithms that may be used to detect workload changes or steady states based on current and past monitored statistics. Other examples may include more complex time series algorithms for performing changepoint detection for when workload evolution has a periodicity. As an example, the HOT-SAX algorithm may be used to find sequences of time series that are different from other sequences, which can be used to determine if there has been a workload change in a more complex system or could alternatively be used to identify a steady state in a more complex system by determining that sequences of time series are not different from other sequences. As another example, the FLOSS algorithm or other similar algorithms can segment online streaming data which can be used to detect when the streaming data changes or has stayed consistent for a particular period of time.

Parameter Adjustment

In an embodiment, the system adjusts three parameters for spin-locking of queries or other resource access requests: a spin wait delay value, a spin wait pause multiplier value, and a sync-loop value. Other embodiments may include adjustments of one or more the aforementioned values. In an embodiment, the system performs the adjustments in a particular order. For example, the system may initially adjust the spin wait delay value, followed by the spin wait paus multiplier value, followed by a sync-loop value. Embodiments may additionally include multiple rounds of adjustments where after adjusting each of the values using the methods described herein, the system performs additional adjustments of the values.

Figure 2:
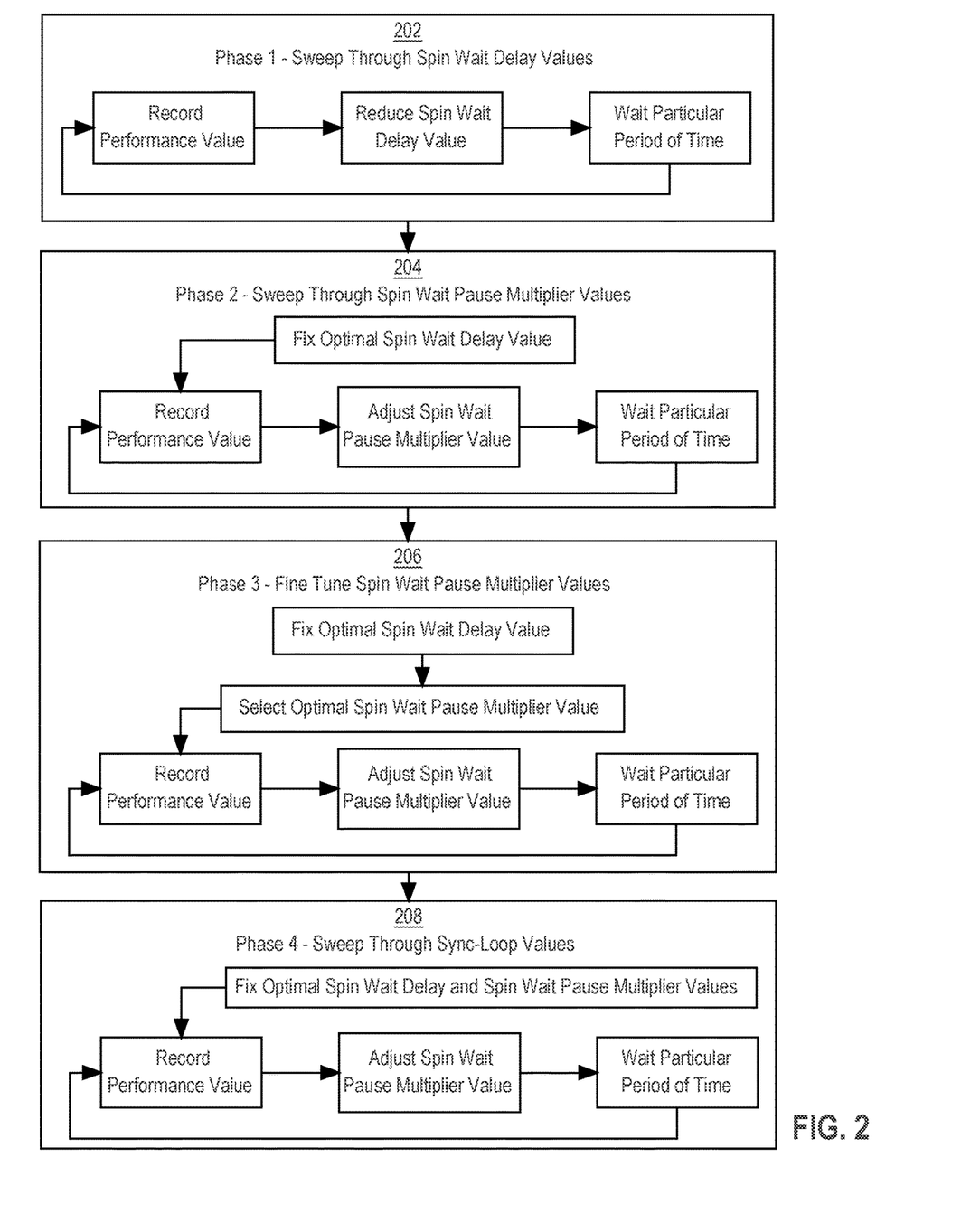
FIG. 2 depicts an example method of adjusting parameters for spin-locking of queries or other resource access request.

FIG. 2 depicts an example method of adjusting parameters for spin-locking of queries or other resource access request. The phases of FIG. 2 relate to the phases of the tuning agent thread in FIG. 1. Other embodiments may use more or less phases or steps for adjusting the parameters. At step 202, the system sweeps through spin wait delay values. For example, the system may begin at a maximum spin wait delay value and perform the three steps of step 202 until the system reaches a minimum spin wait delay value. The maximum spin wait delay value and minimum spin wait delay value may be pre-configured or set through user input. The spin wait pause multiplier value and the sync-loop value may be set at default values or pre-configured values based on a current or prior workload. For example, if the system is performing the sweep after a workload change, the system may use the values that had been set prior to the workload change.

The sweep through spin wait delay values may comprise three steps: recording a performance value, reducing the spin wait delay by a specified amount, and waiting a particular period of time. The performance value may comprise a value monitored by the monitor state thread and/or received directly by the tuning agent. As an example, the performance value may be the throughput value, thereby measuring a number of satisfied queries or transactions per second. Recording the performance value may comprise generating an entry comprising a current spin wait delay value and the performance value. Thus, each entry may identify the spin wait delay value at which the recorded performance value was identified.

Reducing the spin wait delay may comprise sending instructions to the resource management system and/or server computer to cause the resource management system and/or server computer to reduce the spin wait delay by the specified value. The specified value may be pre-configured or received through user input. Higher values will cause the sweeps to be shorter, but will reduce accuracy.

Once the value has been reduced, the system waits a particular period of time before recording the next measurement. The particular period of time may be a static period of time, such as a few seconds, or a dynamic period of time. For example, the system may wait a static period of time prior to performing the methods described above to detect a steady state. Once a steady state has been detected, the system may move to the next step and record the next measurement. Thus, the particular period of time may be dependent on how long it takes for the workload to reach a steady state after the changes have been implemented.

After sweeping through the spin wait delay values, the system may identify an optimal spin wait delay value. For example, the system may identify, in the plurality of recorded entries, a highest performance value. The system may identify the spin wait delay value that was recorded with the highest performance value as the optimal spin wait delay value.

At step 204, the system sweeps through spin wait pause multiplier values. The system may first set the spin wait delay value to the identified optimal value prior to performing the three steps of recording a performance value, adjusting the spin wait pause multiplier value, and waiting a particular period of time. The adjustments to the spin wait pause multiplier value may differ from the adjustments for the spin wait delay values. For example, the spin wait delay values may decrement by 10 for each adjustment while the spin wait pause multiplier values decrement by 5 for each adjustment. Similarly, the time period used in the waiting portion of the sweep may differ between the spin wait delay value and spin wait pause multiplier value and/or may be based on when the system reaches a steady state. Similar to the spin wait delay values, the system may select an optimal spin wait pause multiplier value as the value corresponding to the best performance value.

At step 206, the system fine tunes the spin wait pause multiplier values. The system may keep the optimal spin wait delay value fixed and select the optimal spin wait pause multiplier value from step 204. The system may then perform a similar sweep process comprising recording a performance value, adjusting a spin wait pause multiplier value, and waiting a particular period of time.

The adjustments to the spin wait pause multiplier value may be finer adjustments than were used in step 204. For example, if the spin wait pause multiplier value decremented by 10 with each adjustment in step 204, step 206 may comprise a sweep through values between 5 less than the selected spin wait pause multiplier value and 4 more than the selected spin wait pause multiplier value with the adjustments being and incrementing or decrementing by 1. Thus, the system may sweep through values close to the selected spin wait pause multiplier value at a finer rate. By performing the fine adjustments after performing course adjustments, the system allows faster convergence on an optimal value for the spin wait pause multiplier in an efficient manner. As with the previous steps, after performing the fine adjustments and recording the results, the system identifies an optimal spin wait pause multiplier value.

At step 208, the system sweeps through the sync-loop values. The system may fix the optimal spin wait delay value and spin wait pause multiplier value from steps 202 and 206 and begin a similar sweep process whereby the system records a performance value, adjusts the spin wait pause multiplier value, and waits a particular period of time. As with the other values, the level of adjustment and the particular period of time may differ or be the same for the sync-loop values as for either of the previous values.

While adjustments described above have been described in terms of decrementing, other methods of adjusting the aforementioned values may be used, such as incrementing from a minimum value. A direction for adjustment may be set in advance or determined based on monitored state data. For example, the system may be configured to increment spin wait delay values from a current value to a maximum value if the state data shows that rounds-per-spin of the spin locking with the current saturation is close to saturation. Thus, in embodiments where a direction of adjustment can be determined from monitored data, the system may begin adjusting at a current parameter value and/or set the current parameter value to a maximum or minimum value for the adjustments.

Additionally, while the above describes obtaining measurements at each value within a range prior to determining an optimal value, the system may be configured to stop earlier based on recorded performance values or other information. For example, the system may be configured to stop decrementing a parameter's value if one or more performance statistics has either hit a threshold value or has been decreasing in a threshold number of previous iterations. For example, if the past four spin wait delay values have been recorded with steadily decreasing performance values, the system may stop decreasing the spin wait delay values and select a spin wait delay value from the ones that have been recorded.

Machine Learning and Reinforcement Learning Adjustments

In an embodiment, the system uses machine learning techniques to increase the speed at which the tuning agent converges on a set of parameters. The machine learning system may comprise any supervised machine learning system, such as linear regression or neural networks. In an embodiment training data is generated using a representative corpus of workloads that have been exposed to a variety of combinations of values for the aforementioned parameters. For each workload and parameter combination, the system may store workload statistics, such as a workload's latency, and one or more parameter values and/or functions of the parameter values. For example, the system may store an average time-to-sleep value for the resource requests. The time to sleep values may be retrieved from the resource management system and/or system executing the spin-locking.

In an embodiment, the system trains the machine learning system using the latency distributions for each of the plurality of workloads as inputs and the average time to sleep as an output. When a steady state or workload change is detected, the system may use the monitored state data of the resource management system and the machine learning system to compute a time to sleep for the spin-locking. Using the time to sleep value computed through the machine learning system, the system may narrow down values to sweep through for the one or more parameters. For instance, the time to sleep for a thread can be computed as an average duration of a spin lock loop, which can be determined from the spin wait delay and spin wait pause multiplier value, multiplied by the number of times the lock is allowed to spin, which is the sync-loop parameter value.

After the spin wait delay value is identified through the sweeps, the system may identify a plurality of combinations of spin wait pause multiplier values and sync-loop values that would generate the time to sleep value. The plurality of spin wait pause multiplier values and sync-loop values may include values at a minimum possible spin wait pause multiplier value based on the spin wait delay value and the time to sleep value, maximum spin wait pause multiplier value based on the spin wait delay value and the time to sleep value, and one or more values in between. Thus, the number of spin wait pause multiplier values through which the system searches may be reduced. Additionally, once a spin wait pause multiplier value is identified, the system may compute the sync-loop value that would generate the computed time to sleep value.

Other embodiments may use the time to sleep value in different ways to optimize the efficiency of identifying parameter values. For example, the time to sleep value may be used to identify both maximum values for the spin wait delay value. Additionally or alternatively, the system may narrow down the possible spin wait pause multiplier values based on the likely sync-loop values given the time to sleep value.

While the machine learning system described above describes computing a time to sleep value from which the other parameter values are derived, in an embodiment a machine learning system directly computes one or more of the aforementioned parameter values. For example, the machine learning system may be trained using the latency distributions as inputs with the spin wait delay value, spin wait pause multiplier value, and/or sync-loop value as outputs. In an embodiment, multiple machine learning systems are used, each of which configured to compute a different parameter value. As another example, the machine learning system may be configured to compute a delay value identifying an average duration of a spin-lock loop. With the average duration of a spin-lock loop determined, the system can identify a spin wait delay value and spin wait pause multiplier value that would generate the delay value. The system may then fine tune the two values through sweeps through values surrounding the identified values, such as a sweep from 5 less than the value to 5 more than the value.

In an embodiment, the system may use reinforcement learning techniques to increase the speed at which parameter values are identified. For example, the system may treat each state of the resource management system as a state in a Markov chain with the Markov chain actions being adjustments of one or more of the parameter values. Thus, using a reinforcement learning system, the system may identify which of the parameters to adjust based on the current state of the resource management system, with the current state of the resource management comprising one or more statistics relating to performance, such as a throughput value, current parameter values, and statistics relating the spin-locking of resource requests. Based on a performance metric, such as a throughput value, the system may use reinforcement learning techniques to converge on an optimal performance value through adjustments of the parameter values.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
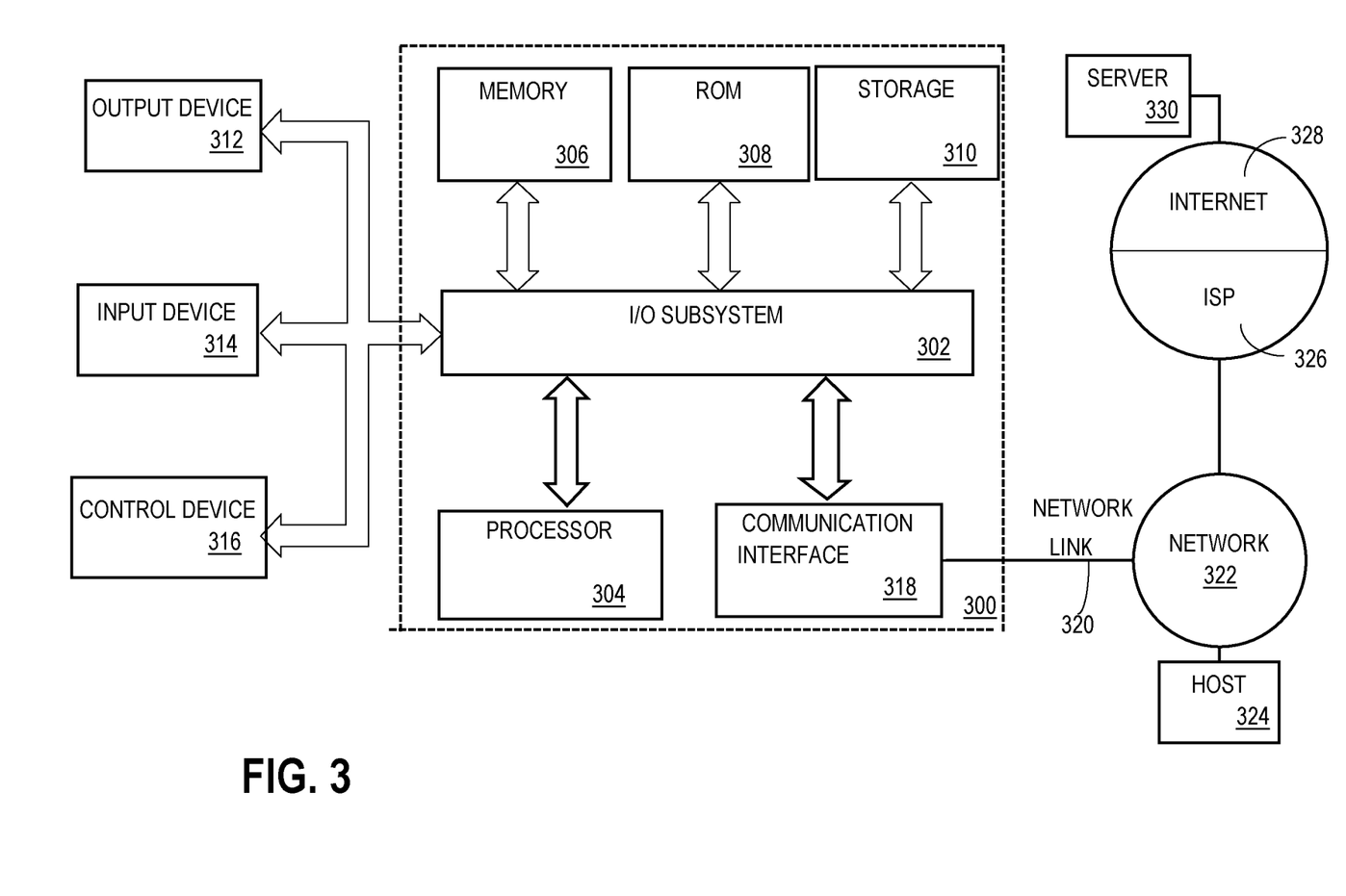
FIG. 3 is a block diagram that illustrates a computer system upon which an embodiment of the disclosure may be implemented.

For example, FIG. 3 is a block diagram that illustrates a computer system 300 upon which an embodiment of the disclosure may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages includingC#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature F2ootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  continuously retrieving from a resource management system, through a continuously running independent process, state values defining a state of the resource management system;
  based on one or more of the state values retrieved at a first point in time and one or more of the state values retrieved at a second point in time that is after the first point in time, determining that the resource management system has reached a steady state;
  in response to determining that the resource management system has reached a steady state, adjusting a plurality of parameters for spin-locking performed by said resource management system comprising identifying first optimal values for the plurality of parameters and setting the plurality of parameters to the first optimal values;
  after setting the plurality of parameters to the first optimal values, the resource management system performing spin-locking based on the first optimal values;
  based on one or more of the state values retrieved at a third point in time and one or more of the state values retrieved at a fourth point in time that is after the third point in time, detecting a workload change in the resource management system;
  in response to detecting the workload change, readjusting the plurality of parameters for spin-locking performed by said resource management system comprising identifying second optimal values for the plurality of parameters and setting the plurality of parameters to the second optimal values; and
  after setting the plurality of parameters to the second optimal values, the resource management system performing spin-locking based on the second optimal values.

2. The method of claim 1, wherein:
  the state values comprise a throughput value and buffer pool hit rate value;
  said determining that the resource management system has reached a steady state comprises:
    determining that a change in the throughput value between a current throughput value and a previous throughput value is less than a first threshold value, and
    determining that a change in an average buffer pool hit rate value between a current average buffer pool hit rate value and a previous average buffer pool hit rate value is less than a second threshold value.

3. The method of claim 2, wherein determining that the change in the throughput value between the current throughput value and the previous throughput value is less than the first threshold value comprises:
  monitoring a rolling median on the throughput value, wherein the rolling median is defined by a first window of throughput values;
  monitoring a percentage difference between a latest rolling median value in a second window of rolling median values and an oldest median value in the second window of rolling median values;
  wherein said determining that the change in the throughput value between the current throughput value and the previous throughput value is less than the first threshold value is responsive to determining that all of a particular number of consecutive percentage difference values are less than the first threshold value.

4. The method of claim 1,
wherein the state values comprise a throughput value;
wherein detecting the workload change in the resource management system comprises: determining that a change in the throughput value between a current throughput value and a previous throughput value is greater than a threshold value.

5. The method of claim 4, wherein determining that the change in the throughput value between the current throughput value and the previous throughput value is greater than the threshold value comprises:
monitoring a rolling median on the throughput value, wherein the rolling median is defined by a first window of throughput values;
monitoring a percentage difference between a latest rolling median value in a second window of rolling median values and an oldest median value in the second window of rolling median values;
wherein said determining that the change in the throughput value between the current throughput value and the previous throughput value is greater than the threshold value is responsive to determining that all of a particular number of consecutive percentage difference values are greater than the threshold value.

6. The method of claim 1, wherein adjusting the plurality of parameters for spin-locking performed by said resource management system comprises performing, using a plurality of spin wait delay values in a range of spin wait delay values beginning with a highest value of the range of spin wait delay values, adjustments to a spin wait delay value for spin-locking performed by said resource management system by:
waiting for a particular period of time;
recording a performance value after waiting for the particular period of time; and
decrementing the spin wait delay value by a particular amount.

7. The method of claim 6, wherein adjusting the plurality of parameters for spin-locking performed by said resource management system further comprises:
setting a particular spin wait delay value of the plurality of spin wait delay values, the particular spin wait delay value corresponding to a highest recorded performance value;
performing, using a first plurality of spin wait pause multiplier values within a first range of spin wait pause multiplier values, adjustments to a first spin wait pause multiplier value by:
waiting a second period of time,
recording a second performance value after waiting the second period of time, and
adjusting the first spin wait pause multiplier value to a next spin wait pause multiplier value;
identifying a wait pause multiplier value corresponding to a highest recorded performance value;
performing, using a second plurality of spin wait pause multiplier values with a second range of spin wait pause multiplier values, the second range comprising a smaller range than the first range and including the wait pause multiplier value corresponding to the highest recorded performance value, adjustments to the first spin wait pause multiplier value by:
waiting a third period of time,
recording a third performance value after waiting the third period of time, and
adjusting the first spin wait pause multiplier value to a next spin wait pause multiplier value of the second plurality of spin wait pause multiplier values, wherein adjusting in the second range is performed at a finer adjustment than adjusting in the first range.

8. The method of claim 7, wherein adjusting the plurality of parameters for spin-locking performed by said resource management system further comprises:
setting a particular spin wait pause multiplier value of the second plurality of spin wait pause multiplier values, the particular spin wait pause multiplier value corresponding to a highest recorded performance value recorded during the adjustments to the first spin wait pause multiplier value;
performing, using a plurality of sync-loop values, adjustments to a sync-loop value for spin-locking performed by said resource management system by:
waiting a fourth period of time,
recording a fourth performance value after waiting the fourth period of time, and
adjusting the sync-loop value to a next sync-loop value of the plurality of sync-loop values.

9. The method of claim 1,
wherein the state values comprise one or more spin-lock related statistics;
wherein adjusting the plurality of parameters for spin-locking performed by said resource management system further comprises determining a direction of adjustment based, at least in part, on the one or more spin-lock related statistics.

10. The method of claim 1, further comprising:
storing a machine learning system trained using a training dataset comprising, for each of a plurality of workload statistic values, a plurality of adjustment values and corresponding performance values, wherein the machine learning system is configured to compute time to sleep values as a function of a workload's latency distribution;
wherein adjusting the plurality of parameters comprises:
using the machine learning system, computing a particular time to sleep value based on one or more of the state values;
computing, from the particular time to sleep value, a plurality of sets of parameter values;
adjusting the plurality of parameters to each set of the plurality of sets of parameter values.

11. The method of claim 1, further comprising:
storing a reinforcement learning system configured to compute an adjustment to the plurality of parameters based on one or more of the state values;
wherein adjusting the plurality of parameters comprises:
using the reinforcement learning system, computing first adjustments to the plurality of parameters based on one or more of the state values,
adjusting the plurality of parameters using the first adjustments,
obtaining new state values,
using the reinforcement learning system, computing second adjustments to the plurality of parameters based on one or more of the new state values, and
adjusting the plurality of parameters using the second adjustments.

12. A system comprising:
one or more processors:
a memory storing instructions which, when executed by the one or more processors, cause:

continuously retrieving from a resource management system, through a continuously running independent process, state values defining a state of the resource management system;

based on one or more of the state values retrieved at a first point in time and one or more of the state values retrieved at a second point in time that is after the first point in time, determining that the resource management system has reached a steady state;

in response to determining that the resource management system has reached a steady state, adjusting a plurality of parameters for spin-locking performed by said resource management system comprising identifying first optimal values for the plurality of parameters and setting the plurality of parameters to the first optimal values; and after setting the plurality of parameters to the first optimal values, the resource management system performing spin-locking based on the first optimal values.

13. The system of claim 12, wherein the instructions, when executed by the one or more processors, further cause:

based on one or more of the state values retrieved at a third point in time and one or more of the state values retrieved at a fourth point in time that is after the third point in time, detecting a workload change in the resource management system;

after detecting the workload change, readjusting the plurality of parameters for spin-locking performed by said resource management system comprising identifying second optimal values for the plurality of parameters and setting the plurality of parameters to the second optimal values; and after setting the plurality of parameters to the second optimal values, the resource management system performing spin-locking based on the second optimal values.

14. The system of claim 13, wherein the instructions, when executed by the one or more processors, further cause:

after to detecting the workload change:

based on one or more of the state values retrieved at a fifth point in time and one or more of the state values retrieved at a sixth point in time that is after the fifth point in time, detecting a second steady state in the resource management system;

wherein said readjusting the plurality of parameters is performed in response to detecting the second steady state in the resource management system.

15. The system of claim 13, wherein the state values comprise a throughput value;

wherein detecting the workload change in the resource management system comprises: determining that a change in the throughput value between a current throughput value and a previous throughput value is greater than a threshold value;

wherein determining that the change in the throughput value between the current throughput value and the previous throughput value is greater than the threshold value comprises:

monitoring a rolling median on the throughput value, wherein the rolling median is defined by a first window of throughput values;

monitoring a percentage difference between a latest rolling median value in a second window of rolling median values and an oldest median value in the second window of rolling median values;

wherein said determining that the change in the throughput value between the current throughput value and the previous throughput value is greater than the threshold value is responsive to determining that all of a particular number of consecutive percentage difference values are greater than the threshold value.

16. The system of claim 12, wherein:

the state values comprise a throughput value and buffer pool hit rate value;

said determining that the resource management system has reached a steady state comprises:

determining that a change in the throughput value between a current throughput value and a previous throughput value is less than a first threshold value, and determining that a change in an average buffer pool hit rate value between a current average buffer pool hit rate value and a previous average buffer pool hit rate value is less than a second threshold value.

17. The system of claim 16, wherein determining that the change in the throughput value between the current throughput value and the previous throughput value is less than the first threshold value comprises:

monitoring a rolling median on the throughput value, wherein the rolling median is defined by a first window of throughput values;

monitoring a percentage difference between a latest rolling median value in a second window of rolling median values and an oldest median value in the second window of rolling median values;

wherein said determining that the change in the throughput value between the current throughput value and the previous throughput value is less than the first threshold value is responsive to determining that all of a particular number of consecutive percentage difference values are less than the first threshold value.

18. One or more non-transitory computer-readable media storing instructions which, when executed by one or more processors, cause:

continuously retrieving from a resource management system, through a continuously running independent process, state values defining a state of the resource management system;

based on one or more of the state values retrieved at a first point in time and one or more of the state values retrieved at a second point in time that is after the first point in time, detecting a workload change in the resource management system;

in response to detecting the workload change, initializing a second independent process to detect a steady state in the resource management system;

through the second independent process, detecting a steady state in the resource management system and, in response, adjusting a plurality of parameters for spin-locking performed by said resource management system comprising identifying optimal values for the plurality of parameters and setting the plurality of parameters to the optimal values; and after setting the plurality of parameters to the optimal values, the resource management system performing spin-locking based on the optimal values.

19. The one or more non-transitory computer-readable media of claim 18, wherein:

the state values comprise a throughput value and buffer pool hit rate value;

said detecting the steady state in the resource management system comprises:
  determining that a change in the throughput value between a current throughput value and a previous throughput value is less than a first threshold value, and
  determining that a change in an average buffer pool hit rate value between a current average buffer pool hit rate value and a previous average buffer pool hit rate value is less than a second threshold value.

20. The one or more non-transitory computer-readable media of claim 19, wherein determining that the change in the throughput value between the current throughput value and the previous throughput value is less than the first threshold value comprises:
  monitoring a rolling median on the throughput value, wherein the rolling median is defined by a first window of throughput values;
  monitoring a percentage difference between a latest rolling median value in a second window of rolling median values and an oldest median value in the second window of rolling median values;
  wherein said determining that the change in the throughput value between the current throughput value and the previous throughput value is less than the first threshold value is responsive to determining that all of a particular number of consecutive percentage difference values are less than the first threshold value.

21. The one or more non-transitory computer-readable media of claim 18,
  wherein the state values comprise a throughput value;
  wherein detecting the workload change in the resource management system comprises: determining that a change in the throughput value between a current throughput value and a previous throughput value is greater than a threshold value;
  wherein determining that the change in the throughput value between the current throughput value and the previous throughput value is greater than the threshold value comprises:
    monitoring a rolling median on the throughput value, wherein the rolling median is defined by a first window of throughput values;
    monitoring a percentage difference between a latest rolling median value in a second window of rolling median values and an oldest median value in the second window of rolling median values;
    wherein said determining that the change in the throughput value between the current throughput value and the previous throughput value is greater than the threshold value is responsive to determining that all of a particular number of consecutive percentage difference values are greater than the threshold value.

* * * * *

UNITED STATES PATENT AND TRADEMARK OFFICE
CERTIFICATE OF CORRECTION

| | | |
|---|---|---|
| PATENT NO. | : 11,379,456 B2 | Page 1 of 1 |
| APPLICATION NO. | : 17/060999 | |
| DATED | : July 5, 2022 | |
| INVENTOR(S) | : Kocberber et al. | |

It is certified that error appears in the above-identified patent and that said Letters Patent is hereby corrected as shown below:

On the Title Page

On page 2, Column 2, item (56) under Other Publications, Line 1, delete "\_Buffer\_Poolstats Table,"" and insert -- \_Buffer\_Pool\_Stats Table," --, therefor.

In the Specification

In Column 14, Line 29, delete "includingC#," and insert -- including C#, --, therefor.

In Column 16, Line 10, delete "and or" and insert -- and/or --, therefor.

In Column 17, Line 49, delete "F2ootstrap" and insert -- Bootstrap --, therefor.

In the Claims

In Column 21, Line 41, in Claim 14, before "detecting" delete "to", therefor.

Signed and Sealed this
Twenty-seventh Day of December, 2022

Katherine Kelly Vidal
*Director of the United States Patent and Trademark Office*